(12) United States Patent
Meier et al.

(10) Patent No.: US 9,888,235 B2
(45) Date of Patent: Feb. 6, 2018

(54) IMAGE PROCESSING METHOD, PARTICULARLY USED IN A VISION-BASED LOCALIZATION OF A DEVICE

(71) Applicant: Apple Inc., Cupertino, CA (US)

(72) Inventors: Peter Meier, Munich (DE); Mohamed Selim Benhimane, Milpitas, CA (US)

(73) Assignee: Apple Inc., Cupertino, CA (US)

(*) Notice: Subject to any disclaimer, the term of this patent is extended or adjusted under 35 U.S.C. 154(b) by 325 days.

(21) Appl. No.: 14/430,169

(22) PCT Filed: Jun. 5, 2013

(86) PCT No.: PCT/EP2013/061592
§ 371 (c)(1),
(2) Date: Mar. 20, 2015

(87) PCT Pub. No.: WO2014/048590
PCT Pub. Date: Apr. 3, 2014

(65) Prior Publication Data
US 2015/0245020 A1    Aug. 27, 2015

(30) Foreign Application Priority Data

Sep. 27, 2012    (WO) .................. PCT/EP2012/069075

(51) Int. Cl.
*G06K 9/36*    (2006.01)
*H04N 17/00*    (2006.01)
(Continued)

(52) U.S. Cl.
CPC ......... *H04N 17/002* (2013.01); *G01S 5/0247* (2013.01); *G01S 5/163* (2013.01);
(Continued)

(58) Field of Classification Search
None
See application file for complete search history.

(56) References Cited

U.S. PATENT DOCUMENTS 5,647,015 A    7/1997    Choate et al.
5,792,610 A *  8/1998    Witney ................ C12Q 1/6816
                                                      356/483

(Continued)

FOREIGN PATENT DOCUMENTS

CN    102435172 A    5/2012
GB      2315124 A    1/1998
(Continued)

OTHER PUBLICATIONS

Holzer et al. "Distance Transform Templates for Object Detection and Pose Estimation", IEEE Computer Society Conference on Computer Vision and Pattern Recognition, 2009.
(Continued)

*Primary Examiner* — Iman K Kholdebarin
(74) *Attorney, Agent, or Firm* — Blank Rome LLP

(57) ABSTRACT

An image processing method includes the steps of providing at least one image of at least one object or part of the at least one object, and providing a coordinate system in relation to the image, providing at least one degree of freedom in the coordinate system or at least one sensor data in the coordinate system, and computing image data of the at least one image or at least one part of the at least one image constrained or aligned by the at least one degree of freedom or the at least one sensor data.

20 Claims, 5 Drawing Sheets

(51) Int. Cl.

| | |
|---|---|
| *G01S 5/02* | (2010.01) |
| *G01S 5/16* | (2006.01) |
| *H04N 5/232* | (2006.01) |
| *G06K 9/32* | (2006.01) |
| *G06K 9/52* | (2006.01) |
| *G06T 5/00* | (2006.01) |
| *H04N 7/18* | (2006.01) |
| *G06T 7/73* | (2017.01) |
| *G06T 7/246* | (2017.01) |
| *G01S 19/53* | (2010.01) |

(52) U.S. Cl.
CPC .............. *G06K 9/3208* (2013.01); *G06K 9/52* (2013.01); *G06T 5/00* (2013.01); *G06T 7/251* (2017.01); *G06T 7/75* (2017.01); *H04N 5/23229* (2013.01); *H04N 5/23293* (2013.01); *H04N 7/18* (2013.01); *G01S 19/53* (2013.01); *G06T 2207/20036* (2013.01); *G06T 2207/20101* (2013.01); *G06T 2207/30244* (2013.01)

(56) References Cited

U.S. PATENT DOCUMENTS

| | | | |
|---|---|---|---|
| 5,850,469 A | 12/1998 | Martin et al. | |
| 6,763,129 B1* | 7/2004 | Honda | G06K 9/40 382/132 |
| 7,233,691 B2* | 6/2007 | Setterholm | G06T 7/593 382/154 |
| 7,583,858 B2* | 9/2009 | Gallagher | G06T 5/006 345/427 |
| 9,008,462 B2* | 4/2015 | Akhbardeh | A61B 6/032 128/922 |
| 9,443,355 B2* | 9/2016 | Chan | G06F 3/048 |
| 9,542,732 B2* | 1/2017 | Bogan | G06T 3/0075 |
| 9,607,236 B1* | 3/2017 | Wilbert | G06T 11/60 |
| 2003/0026385 A1* | 2/2003 | Dinten | A61B 6/482 378/98.9 |
| 2006/0071945 A1 | 4/2006 | Anabuki | |
| 2006/0078215 A1* | 4/2006 | Gallagher | G06T 3/00 382/254 |
| 2007/0092161 A1 | 4/2007 | Aratani et al. | |
| 2009/0110267 A1 | 4/2009 | Zakhor | |
| 2010/0119139 A1* | 5/2010 | Bertram | G06T 11/005 382/131 |
| 2011/0164165 A1* | 7/2011 | Hashimoto | G02B 7/36 348/340 |
| 2013/0057714 A1* | 3/2013 | Ishii | H04N 5/23248 348/208.4 |
| 2013/0322723 A1* | 12/2013 | Akhbardeh | A61B 6/032 382/131 |
| 2014/0037136 A1* | 2/2014 | Ramalingam | G06T 7/73 382/103 |
| 2015/0235367 A1* | 8/2015 | Langer | G06T 7/0042 348/135 |

FOREIGN PATENT DOCUMENTS

| | | |
|---|---|---|
| JP | 2001111835 A | 4/2001 |
| JP | 2006516908 A | 7/2006 |
| JP | 2007043545 A | 2/2007 |
| JP | 2007524950 A | 8/2007 |
| JP | 2012038318 A | 2/2012 |
| WO | 2012112929 | 8/2012 |

OTHER PUBLICATIONS

Klein et al. "Full 3D Edge Tracking with a Particle Filter", Proc. British Machine Vision Conference, 2006.
Kurz et al. "Inertial Sensor-Aligned Visual Feature Descriptors", Computer Vision and Pattern Recognition, 2011.
C. Steger, "Occlusion, clutter, and illumination invariant object recognition," International Archives of Photogrammetry and Remote Sensing, vol. XXXIV, 2002.
Comport et al., "Real-Time Markerless Tracking for Augmented reality: The Virtual Visual Servoing Framework," Transactions on Visualization and Computer Graphics, 2006.
Karlekar et al., "Positioning, Tracking and Mapping for Outdoor Augmentation," International Symposium on Augmented and Mixed Reality, 2010.
Klein et al., "Improving the Agility of Keyframe-Based SLAM," European Conference on Computer Vision, 2008.
Reitmayr, et al., "Going Out: Robust Model-Based Tracking for Outdoor Augmented Reality," Mixed and Augmented Reality, Oct. 1, 2006.
Satoh et al. "A Hybrid Registration Method for Outdoor Wearable Mixed Reality," vol. 7, No. 2, pp. 129-138, 2002.
T. Drummond, R. Cipolla, "Real-time Tracking of complex structures with on-line camera calibration," British Machine Vision Conference, 1999.
Tamaazousti et al., "Real-Time Accurate Localization in a Partially Known Environment: Application to Augmented Reality on textureless 3D Objects," TrakMark, 2011.
Vacchetti et al., "Combining edge and texture information for real-time accurate 3D camera tracking," International Symposium on Augmented and Mixed Reality, 2004.
Wiedermann et al., "Recognition and Tracking of 3D Objects," Deutsche Arbeitsgemeinschaft fur Mustererkennung, 2008.
Wuest et al., "Tracking of industrial ojects by using CAD models," Jounral of Virtual Reality and Broadcasting, vol. 4, 2007.

* cited by examiner

Fig. 3
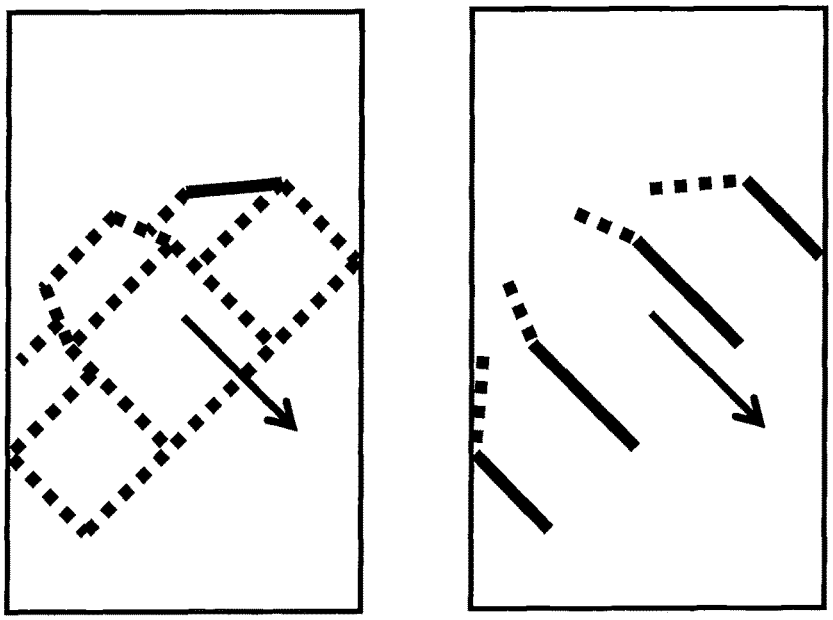
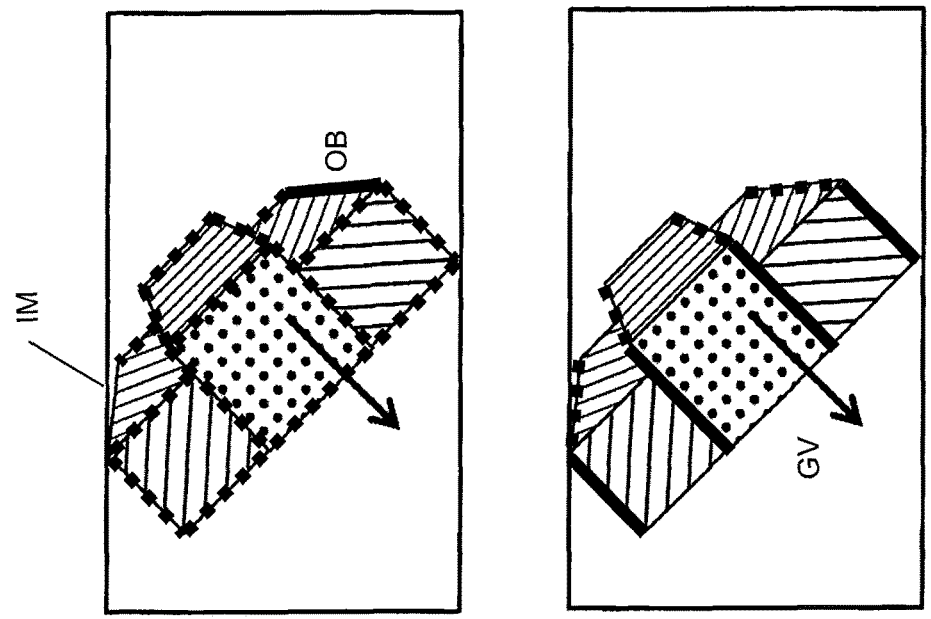

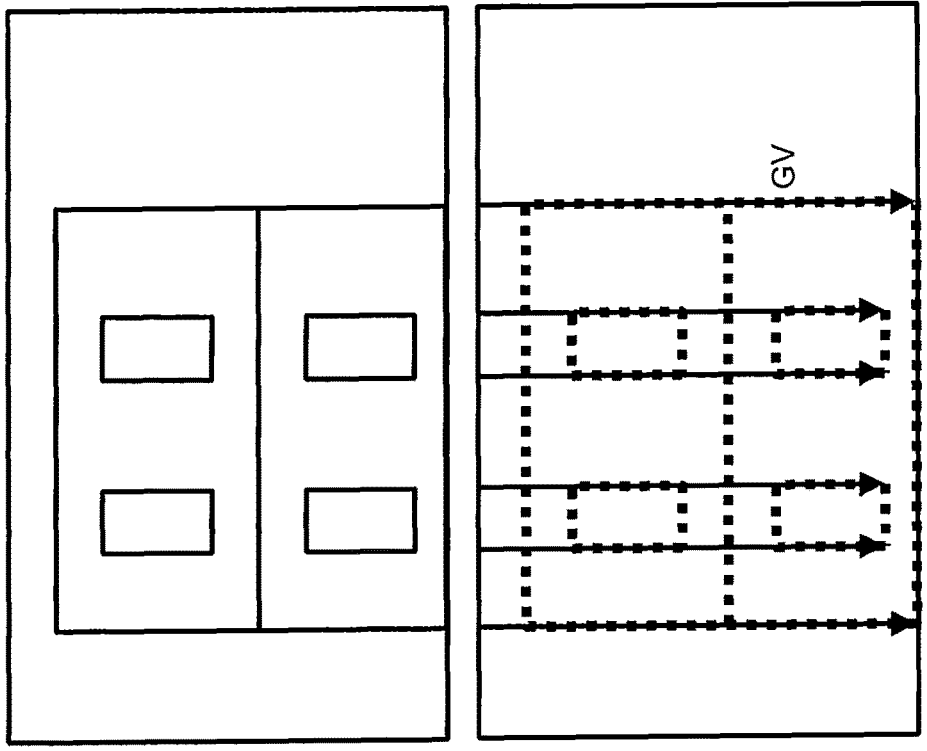

IMAGE PROCESSING METHOD, PARTICULARLY USED IN A VISION-BASED LOCALIZATION OF A DEVICE

This application is entitled to the benefit of, and incorporates by reference essential subject matter disclosed in PCT Application No. PCT/EP2013/061592 filed on Jun. 5, 2013, which claims priority to PCT/EP2012/069075 filed Sep. 27, 2012.

BACKGROUND OF THE INVENTION

1. Technical Field

The present invention relates to an image processing method, particularly used in a vision-based localization of a device, which comprises providing at least one image of at least one object or part of the at least one object. The invention also relates to a computer program product comprising software code sections or hardware accelerated processing units for performing the method.

2. Background Information

Image processing including filtering and extraction of information from an image are key tools needed to solve higher level problems such as but not limited to the areas of computer vision, machine learning, robotics or general image enhancement. One of the numerous examples is the detection of edges in an image that can contain a known object or part of a known object, which can be used for matching these edges with edges of the known object to which a reference coordinate system is attached. Based on the matches between the edges in the image and the object itself the camera with which the image was captured can be localized with respect to the reference coordinate system of the known object.

Image processing, filtering and extraction of information from an image can be done in very different ways, such as but not limited to morphological operators and convolution based on kernels, and by applying or combining the same or different processing steps, filters or extraction methods on the intermediate results of an earlier or parallel processing step. Image processing, filtering and extraction of information can be done but is not limited to perform, analyze, extract or create intensities, gradients, derivatives, edges, lines, segments, corners, features, smoothing, blur, transformation, denoising, sharpening, erosion and/or dilation. Besides the isotropic image processing, filter or extraction methods some methods are anisotropic, such as but not limited to 1D or imageaxis-aligned convolution kernels, such as, e.g., gradient filter like the known Sobel, Prewitt or Scharr filter, which use image axis-aligned convolution kernels, which means that generally these kernels extract image-horizontal or image-vertical gradients of the image. Isotropic image processing, filter or extraction methods can also be adapted to be anisotropic, by for instance using a 1D convolution kernel instead of the 2D one, like for instance for a smoothing convolution kernel.

The following types of standard approaches exist for image processing in this context: In case the image processing operator of the image processing method comprises image edge detection, generally the image gradient computation comprises applying image filters, such as Sobel, Prewitt or Scharr filters, with kernels aligned with the image axes. This means that generally these kernels produce image-horizontal or image-vertical gradients (see upper row A in FIG. 3). These approaches do not consider any additional information, if any, on some degrees of freedom and, thus, by themselves do not detect any object properties with respect to a known orientation, such as gravity-aligned edges.

If based on these image-axis aligned kernel based filters edges of a specific orientation, such as the gravity aligned edges in the image, need to be filtered, additional post-processing of the earlier results of the image-axis aligned filters could be applied. For instance, the orientation of each edge point in the image can be computed based on the image-horizontal and the image-vertical gradient for that point. Finally the edge-orientation of each pixel in the image could be compared with the projected gravity orientation in the image. This means for this approach that the image-horizontal and image-vertical gradients would need to be computed beforehand by applying both axis-aligned kernels, and an additional post processing step of comparison would be needed to be applied. This would make such an approach computationally more expensive.

A second approach, which is using additional information on some degrees of freedom, is to first adapt the whole image to align with this additional information (see FIG. 4). For instance, in the case of constraining the image processing method to compute gravity aligned data, the whole image can first be rectified, such that one image-axis is aligned with the projected gravity vector in the image, and afterwards the image-axis aligned image processing can be applied. In the case of gradient filter this will produce gravity aligned gradients. This second approach has two drawbacks: First, the image filters are not processing on the original image anymore, and thus the results of the final filter depend on the intermediate results of the performed rectifying approach. Second, the rectification itself is needed and thus this approach is computationally more expensive than one directly processing on the original image.

It would therefore be beneficial to provide an image processing method which is capable of providing a more efficient result in terms of quality of its result and processing speed.

SUMMARY OF THE INVENTION

According to an aspect, there is provided an image processing method, comprising the steps of: providing at least one image of at least one object or part of the at least one object, and providing a coordinate system in relation to the image, providing at least one degree of freedom in the coordinate system or at least one sensor data in the coordinate system, and computing image data of the at least one image or at least one part of the at least one image constrained or aligned by the at least one degree of freedom or the at least one sensor data.

Particularly, it is proposed to use at least one degree of freedom with high confidence degree to derive image processing methods constrained by the values of the at least one high confidence degree of freedom. Optionally, actual confidence degrees of high confidence degrees of freedom, used to constrain the image processing method, can be utilized to further adjust the properties of the image processing method. Particularly, an image processing method may comprise the steps of providing at least one image of at least one object or part of the at least one object, providing a coordinate system in relation to the image, providing at least one degree of freedom, and optionally including a corresponding confidence degree, in the coordinate system or at least one sensor data in the coordinate system and computing image data of the at least one image or at least one part of the at least one image constrained by the at least one degree of freedom or the at least one sensor data. For example, the computed image data can be the result of image processing including morphological image operations or image filtering that could be constrained or aligned according to the degrees of freedom with high confidence degree or can be constrained or aligned according to high confident sensors providing data used in the image processing method in relation to the image or a device capturing the image. More specifically, in case the image processing operator of the image processing method comprises image edge detection, generally the image gradient computation comprises applying image filters (such as Sobel filter or Prewitt filters) with kernels aligned with the image axes. This means that generally the kernels produce horizontal or vertical gradient. Given image data with degrees of freedom with high confidence degree such as rotations determined with a gravity sensor assumed to be accurate (wherein the gravity sensor may be associated with the device which captures the image), one could use kernels of filters aligned with the projected orientation of the gravity vector in the image or having some pre-defined orientation with respect to the projected orientation of the gravity vector in the image. It is important to note that the image processing does not necessarily require a representation of the object.

An embodiment of an image processing method includes a matching process, such as matching at least one feature of the object in the at least one image with at least one feature of a digital representation of the object.

The image processing method could be used to generate a distance transform image based on the result of the image processing method.

An example usage of the image processing method could include running a global registration algorithm, where different degrees of freedom are iteratively refined and the quality of the iteration is measured by some predefined cost-function, for example involving a distance transform image (such as S. Holzer, S. Hinterstoisser, S. Ilic, N. Navab, Distance Transform Templates for Object Detection and Pose Estimation, IEEE Computer Society Conference on Computer Vision and Pattern Recognition, 2009). The iterations of the global registration algorithms could be controlled by a particle filter approach (such as Georg Klein and David Murray, Full-3D Edge Tracking with a Particle Filter, In Proc. British Machine Vision Conference, 2006). For example, the method is used in a vision-based localization of a device, such as a device which is associated with a capturing device for capturing the at least one image.

For example, a device, such as a mobile, stationary or distributed computer system, which runs an image processing method, is associated with a capturing device for capturing the at least one image, wherein the method further comprises the steps of capturing the at least one image with the capturing device and providing an estimation of intrinsic parameters of the capturing device.

The usage of "the confident degree of freedom constrained image processing operators" of an image processing method, as set out above, can be during matching of correspondences between the image and the representation of the objects.

Thus, according to an idea of the invention, to solve higher level tasks, such as but not limited to vision-based localization of a moving camera with respect to complex scenes in outdoor environments, the localization system can take advantage of additional information on some degrees of freedom of the camera pose, comprising its position and orientation, provided by e.g. but not limited to, attached sensors. This additional information in the different degrees of freedom is given with respect to a reference coordinate system attached to the object or scene, with respect to which the camera is localized and can be of different confidence degrees. It can be treated and used differently according to its confidence degree and at different steps within processing of the higher level task to support it, such as the vision-based localization. For instance, and more practically, the sensors attached to modern mobile devices equipped or attached to a camera, like smart phones, can provide the orientation of the device, with respect to gravity with high confidence. This information can be used to constrain the within the vision-based localization of the camera with respect to a gravity aligned reference coordinate system of the objects in an outdoor environment from a six degree of freedom to a four degree of freedom optimization, which in general results in more robust solutions.

According to an aspect of the invention there is proposed an approach which takes advantage of additional information on the degrees of freedom with different confidences of the camera's pose with respect to the reference coordinate system, at a particular step within the localization, namely during image processing. Particularly, such approach may adapt existing image processing methods by constraining them by at least one degree of freedom with high confidence of the camera's pose with respect to the reference, e.g. the object coordinate system. The constrained image processing method can be further adjusted to reflect the respective confidence degrees of one or more constraining degrees of freedom. This approach is not limited to the usage within the localization of a camera, but can also be applied in general and for other tasks and applications using image processing. The proposed method can be applied in general to any of the previously mentioned image processing, filter or extraction methods.

Preferably, the computed image data is a result of image processing including morphological image operations or image filtering.

According to an embodiment, the computing of image data is constrained or aligned according to degrees of freedom with a particular, preferably high, confidence degree or is constrained or aligned according to, preferably high confident, sensors providing data used in the image processing method in relation to the image or a device capturing the image.

According to an embodiment, the image processing method includes an image gradient computation which comprises filtering of gravity aligned gradients in the image.

According to another embodiment, the image processing method includes an image gradient computation which comprises image filtering with kernels, wherein the kernels are computed depending on the gravity vector measurement. For example, in case the image plane of the image is fronto-parallel to the gravity vector, the same gravity aligned kernel could be applied to the whole image.

According to an embodiment, the method further includes running a global registration algorithm, where different degrees of freedom are iteratively refined and a quality of the iteration is measured by a predefined cost-function, particularly involving a distance transform image.

For example, the image processing method may be operated in relation to a device which is associated with a capturing device for capturing the at least one image, wherein the method further comprises the steps of capturing the at least one image with the capturing device and providing an estimation of intrinsic parameters of the capturing device.

Generally, the image processing method may be operated on the device associated with the capturing device, or may be operated on a remote server which is in communication with the device and receives data in relation to the device.

According to another embodiment, the image processing method is operated in relation to a device which is associated with a capturing device for capturing the at least one image, wherein the method further comprises providing position and orientation data providing measurements of different degrees of freedom of the capturing device with respect to the coordinate system with respective confidence degrees.

According to an embodiment, the method further includes the step of generating or filtering in the image horizontal gradients of planar or piecewise planar objects attached to a gravity aligned coordinate system.

The image processing method may be operated in relation to a device which is associated with a capturing device for capturing the at least one image, wherein the method further comprises the steps of capturing the at least one image with the capturing device and sharpening the image in the direction of a movement of the capturing device. Given acceleration data provided by sensors in relation to the image or a device capturing the image, it is possible to estimate the motion deblurring kernel which is closely related to the camera trajectory when the camera shutter was open. Traditional methods require a computationally expensive estimation step of such deblurring kernel. Instead, we propose to use accelerometer sensors to avoid such step and make it possible to correct the motion blur e.g. on mobile devices and/or in real-time. The dublurring allows the sharpening of the image. The same principle could be used for image smoothing by applying an oriented filtering kernel according to certain orientation with respect to gravity or with respect to some camera motion.

According to another embodiment, the image processing method is operated in relation to a device which is associated with a capturing device for capturing the at least one image, wherein the method further comprises the steps of capturing the at least one image with the capturing device and an adaption of a size of a kernel of an image filter dependent on the position of the capturing device with respect to the coordinate system.

According to the invention, it may be provided at least one sensor which provides information on one or multiple degrees of freedom, wherein the at least one sensor is selected from the group comprising: a GPS sensor, inertial sensor, accelerometer, gyroscope, magnetometer, odometer, mechanical sensor, particularly rotary encoder, or a combination of multiple sensors and/or tracking systems, such as measuring aims or laser tracker.

For example, the method includes at least one of image processing, filtering and extraction of information, particularly performing, analyzing, extracting or creating at least one of intensities, gradients, derivatives, edges, lines, segments, corners, features, smoothing, blur, transformation, denoising, sharpening, erosion and dilation.

According to an aspect of the invention, the method is a method for determining a position and orientation of a device, which is associated with a capturing device for capturing the at least one image, with respect to an object in an augmented reality application or robotic system navigation.

According to an aspect, it is proposed an image processing, filtering or extraction, including morphological image operations or kernel based image filtering, which compute image data constrained by some confident degrees of freedom of the image coordinate system with respect to some reference coordinate system. Particularly, the input sources may be:

Image data of some object or environment of interest captured by a capturing device, such as a camera (see also FIG. 2 as explained below). The images can be captured by a camera like, but not limited to, a visual light camera, infrared camera, time-of-flight camera, depth camera system, scanning system or any other system providing some kind of image from one or more objects to be analyzed by the image processing method. The object or environment of interest is in a certain coordinate system called reference coordinate system. In case the constrained image processing method is done with respect to a reference coordinate system attached to earth, a building can for instance play the role of an object of interest. More generally, the reference coordinate system might be the earth coordinate system.

Optionally a representation of the object of interest provided in the reference coordinate system, such as but not limited to markers, blue prints, images, templates, depth representations, textured and non-textured polygonal models, textured or non-textured CAD models, and/or a set or map of features, points, edges, lines, gradients, segments, borders, silhouettes, contours, edgelets, orientations and/or polarities.

Camera intrinsic parameter estimation.

Any additional position and orientation data providing measurements of the different degrees of freedom of the camera with respect to the reference coordinate system with their respective confidence degrees. This additional information can for instance be provided by sensors with individual accuracy and precision, such as but not limited to GPS, inertial sensor, accelerometer, gyroscope, magnetometer, odometer, mechanical sensors like rotary encoder, or can be results from a combination of multiple sensors and/or tracking systems such as measuring aims or laser tracker. These sensors can either provide measurements directly with respect to the reference coordinate system or are integrated in calibrated systems which provide this data after some processing of the raw sensor data and potentially additional information of the system. The spatial transformation between the camera and the sensors needs to be known or needs to be evaluated before applying the image processing method. The confidence degrees of different sensors can vary. For instance, a standard GPS embedded in a smart phone gives a position with an accuracy of around 10 meter, the accuracy of a magnetometer depends on the surrounding environment and is often accurate within a few degrees, but could potentially be totally wrong and thus is not reliable. In contrast, the combination of accelerometer and gyroscope built in modem handheld devices to measure gravity orientation can be provided in a fairly high accuracy, as described in D. Kurz, S. BenHimane: "Inertial sensor-aligned visual feature descriptors", Computer Vision and Pattern Recognition, 2011.

The invention also relates to a computer program product adapted to be loaded into the internal memory of a digital computer system, and comprising software code sections by means of which the steps according to any of the above aspects and embodiments are performed when said product is running on said computer system.

BRIEF DESCRIPTION OF THE DRAWINGS

Further aspects, advantageous features and embodiments of the invention will be evident from the following description in connection with the drawings, in which:

FIG. 3 shows possible results of applying Sobel filters on the fronto-parallel captured image according to FIG. 2 to filter gradients in the image, FIG. 5 shows the dependency of the projected gravity vector on the pixel position in the image; in the left column the general case is shown, in the right column the fronto-parallel case is shown, in which the projected gravity vector into the image is independent of the pixel-position in the image.

DETAILED DESCRIPTION OF THE INVENTION

Figure 1:
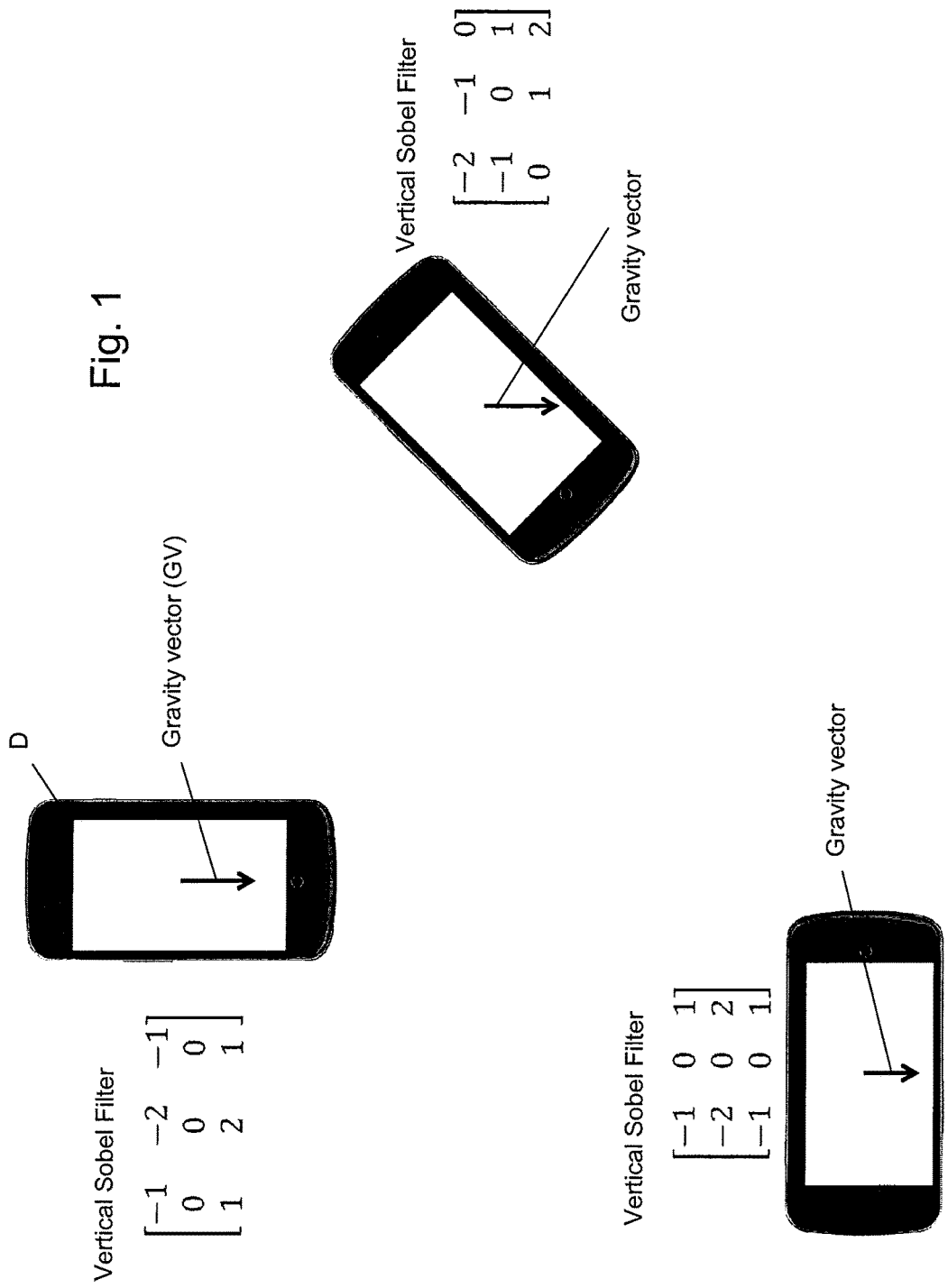
FIG. 1 shows an example of the changing of an image processing filter according to the orientation of the device equipped with a camera with respect to the gravity, if the image plane is fronto-parallel to the gravity.

Generally, there exist applications in which the specific extraction in the image of some object properties, which are aligned to some known degree of freedom of the reference coordinate system, attached to the object, such as an orientation in the object coordinate system, is needed or can be used to improve the result of an image processing step. One example application is the extraction of gravity aligned object edges or edges with a pre-defined orientation with respect to the gravity in images for edge based localization of a moving camera taking the image(s) with respect to gravity aligned reference coordinate system attached to the object. In general, these gravity aligned objects and object edges exist a lot in man-made environments, such as but not limited to outdoor and indoor scenarios, such as but not limited to cities, buildings, industrial plants or furnished rooms. For instance, during an edge based localization of a moving camera in outdoor environments, edges detected in the image captured by the camera need to be matched to the edges of the target object to which the camera needs to be localized to. Additional information on the edges, e.g. their orientation in the image, can support the matching process to the edges of the target object. Therefore, if some orientation, such as the gravity vector in the image, is known, the matching process to the corresponding object edges, such as the gravity aligned object edges, can be supported.

Additionally there exist sensors or systems which can provide additional information on one or multiple degrees of freedom with different confidences degrees of the camera pose with respect to a reference coordinate system, such as but not limited to compass, GPS, inertial sensor, accelerometer, gyroscope, magnetometer, odometer, mechanical sensors like rotary encoder, or results from tracking systems such as measuring aims or laser tracker. These sensors either provide measurements on the different degrees of freedom directly with respect to the reference coordinate system or are integrated in calibrated systems which provide this data after some processing of the raw sensor data and potentially additional information of the system. For instance, modern mobile devices, such as but not limited to modern smart phones, are nowadays usually equipped with a camera providing images and sensors providing among others the orientation of the device and the integrated camera with respect to the gravity with high confidence degrees. The proposed method according to the invention can be implemented to use any of the previously mentioned sensors.

As one or multiple confident degrees of freedom of a camera pose with respect to some reference coordinate system can easily be provided nowadays, such as the camera's pose with respect to a gravity aligned coordinate system provided by a mobile device as stated above, it is proposed herein the usage of this confident information in image processing steps on different levels, to make their result preferably more efficient in terms of quality of their result and/or processing speed and to use their result to solve higher level tasks, such as but not limited to matching object edges having a certain orientation with respect to gravity with their corresponding edges detected in an image.

Figure 2:
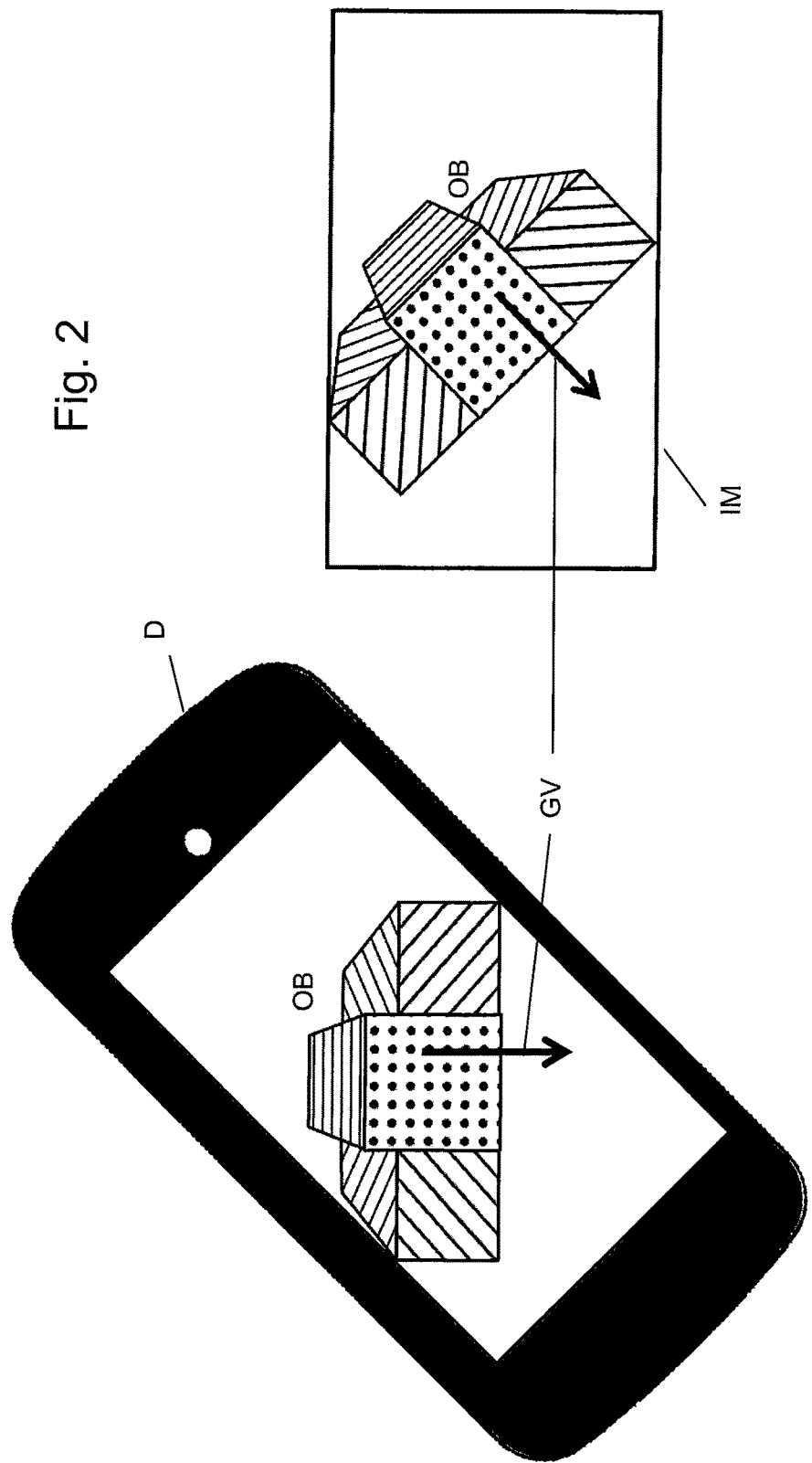
FIG. 2 shows the capturing of an exemplary fronto-parallel image of a gravity aligned object with a mobile device.

In the following, it is also referred to examples as depicted in the drawings in which FIG. 1 shows an example of the changing of an image processing filter according to the orientation of a device D equipped with a capturing device for capturing images, e.g. a camera, with respect to the gravity (indicated by gravity vector GV), if the image plane is fronto-parallel to the gravity. In this example, the device D is a handheld device as described above. The gravity vector GV may be provided by a gravity sensor (not shown) integrated in the device D or a combination of sensors indicative of a gravity vector, such as an accelerometer and/or a gyroscope. FIG. 2 shows the capturing of fronto-parallel image IM of a gravity aligned object OB with a mobile device D. The image processing method as described herein may be operated on the device D or, for instance, on a remote server which is in communication with the device D and receives data in relation to the device D from the device D and sends back computed data to the device D.

FIG. 3 shows results of applying Sobel filters on the fronto-parallel captured image IM to filter gradients in the image. Strong resulting gradients are displayed with a full line, weak gradients are displayed with a dotted line. The upper row (A) shows a standard approach of applying an image-axis aligned Sobel filter kernel (FK), which does not compute strong gravity aligned edges, but image vertical edges. The lower row (B) shows an embodiment of this invention of applying a gravity aligned Sobel filter, which computes strong gradients on the gravity aligned edges.

Figure 4:
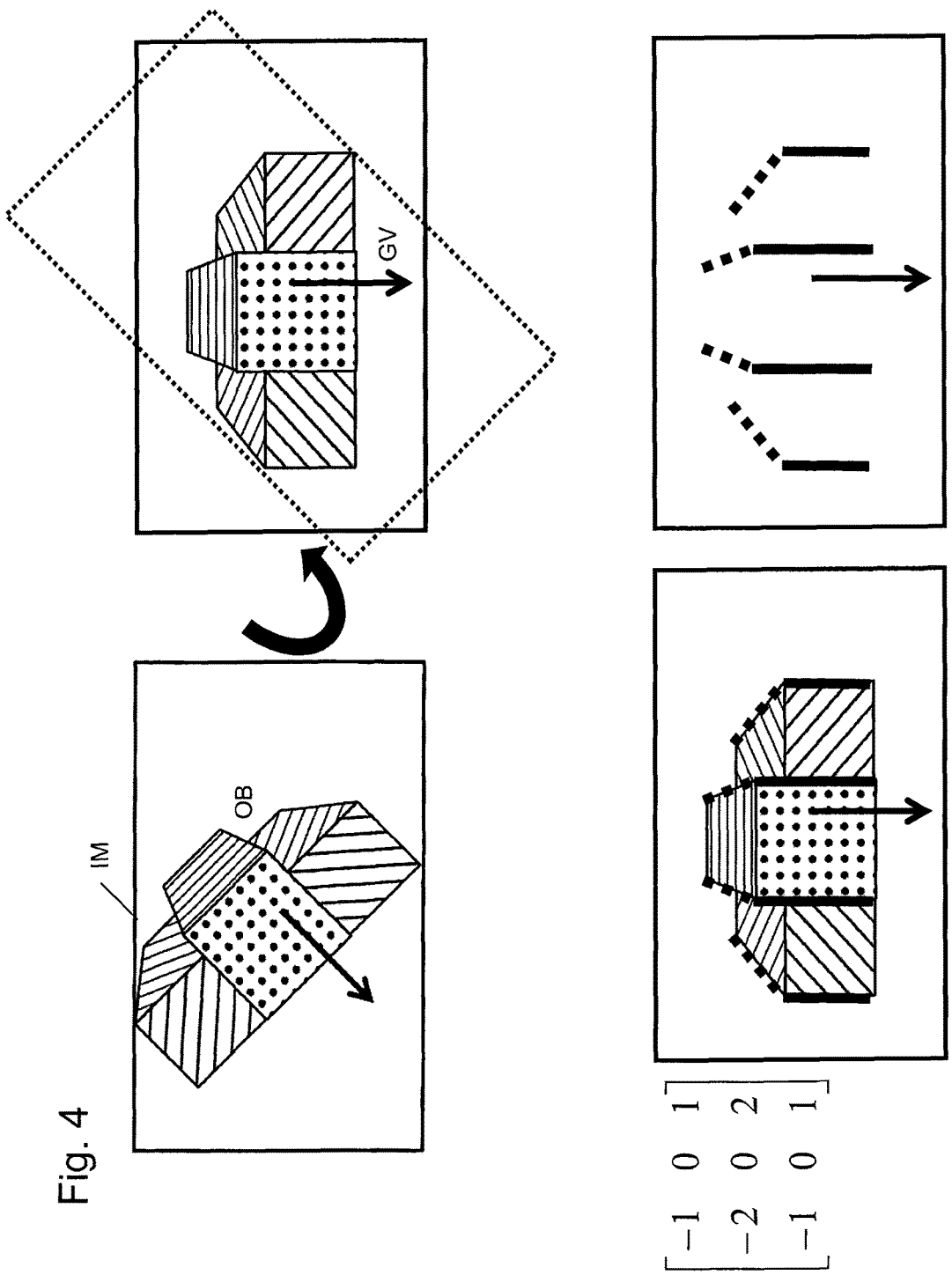
FIG. 4 shows a standard approach of first rectifying the captured image to gravity and then applying an image-axis aligned Sobel filter.

FIG. 4 shows a standard approach of first rectifying the captured image IM to gravity (indicated by gravity vector GV) and then applying an image-axis aligned Sobel filter. Since the captured image is fronto-parallel the rectification can simply be done by a rotation. This approach computes strong gradients on the gravity aligned edges in the image, but needs the additional step of rectification.

FIG. 5 shows a dependency of the projected gravity vector on the pixel position in the image: In the left column (A) the general case is shown. In the right column (B) the fronto-parallel case is shown, in which the projected gravity vector into the image IM is independent of the pixel-position in the image.

The fronto-parallel case can always be assumed when the camera is positioned at a relatively far distance from certain objects, such as buildings, urban sceneries, city skylines, or natural sceneries such as mountains etc. In these cases, its assumption is legitimate. The fronto parallel condition can for example be detected using vanishing lines, and the position of the vanishing points. If there are a certain number of visible edges corresponding to physically parallel lines, the fact that they intersect at infinity or very far could lead to the assumption that the camera is fronto-parallel to the observed scene. If they intersect in the vicinity or not far from the image borders the assumption of the fronto-parallelism may be assumed not plausible.

In case the fronto-parallelism condition cannot be assumed, a kernel filter would need to be computed depending on the pixel position in the image. The lower left image of the FIG. 5 shows that the orientation of the projected gravity vector in the image depends is not the same for all pixels. It varies according to the pixel position, More specifically and explaining aspects of the invention on the examples given in the motivation above and in the described Figures, in case the goal is to extract edges of an object OB in the image IM having a certain orientation with respect to gravity the orientation being provided in a reference coordinate system, like e.g. the earth coordinate system, and additionally sensors attached to the camera of device D provide the degrees of freedom of the orientation of the camera with respect to the gravity with high confidence, then the image processing method of a gradient filter to detect the edges in the image can be constrained, such that it computes directly gravity aligned image gradients. As stated above, standard approaches of image gradient computation comprise applying image filters (such as Sobel, Prewitt or Scharr filters) with kernels aligned with the image axes (see upper row A in FIG. 3). This means that generally the kernels of these image filters produce image-horizontal or image-vertical gradient. Given the degrees of freedom of the orientation of the camera with respect to the gravity with high confidence degree, it is proposed herein to constrain the image filtering by applying kernels of the filter, which are oriented according to the measured gravity vector (see FIG. 1 and lower row B in FIG. 3). By applying kernels depending on the gravity orientation on the image, the gradients with pre-defined orientation with respect to the gravity vector in the image are directly computed. The projected gravity into the image depends on the orientation of the camera with respect to gravity, the camera's intrinsic parameters and on the pixel position in the image. Therefore, the kernel applied to each pixel in the image to compute gravity aligned gradients is in general not the same for the whole image and needs to be computed or provided by, e.g., a lookup table for each pixel position or as an approximation for each image region (see left column A in FIG. 5). If the image plane is fronto-parallel to the gravity (see FIG. 2 and right column B in FIG. 5) the projection of the gravity into the image is the same at every pixel position in the image and, thus, the same gravity aligned kernel can be applied to all pixels of the image. The approximation of applying the same gravity-dependent kernel to the whole image if the image plane is roughly fronto-parallel, can still be sufficient dependent on the application. This can speed up the processing for the whole image.

The proposed approach in this invention takes advantage of the anisotropic nature of these image filters by adapting their kernel to produce strong results, such as high gradient values, for the orientation of interest, such as the projected orientation of the gravity vector in the image, or a pre-defined orientation with respect to the gravity vector. Thus, in comparison to the existing approaches it does not produce image-axis aligned properties but directly produces properties of the orientation of interest without applying the image filtering multiple times on the whole image and without additional post-processing. Additionally it is working directly on the original image data and thus does not depend on the performance in quality and speed of undesired intermediate processing steps, such as but not limited to rectification of the image.

Further, the proposed approach envisions using the confidence degrees, of given high confidence degrees of freedom, to further adjust kernel properties of image filters. E.g. Gaussian based kernels can be oriented according to the high confidence degrees of freedom, while standard deviations can be adjusted according to the provided fidelity levels. An embodiment of such approach would be a Gaussian kernel for edge detection, oriented with respect to the gravity vector, with standard deviations adjusted according to the confidence degrees of the degrees of freedom comprising the gravity vector. E.g. very thin and elongated kernel could be used if the gravity is given with the high confidence. Vice versa, wider kernels, thus taking into account more line orientations, can be used when the gravity is given with the lower confidence degree.

An embodiment of such an image processing method can be based on the given example of how to constrain the image processing method to confidently known projected gravity into the image to extract image gradients with a certain alignment with respect to the gravity vector for a matching between object edges of a given model in a coordinate system with known orientation with respect to the gravity vector. This matching can be embedded in a localization of a moving camera, such as but not limited to a moving camera in outdoor environments. The constrained image filter supports the matching procedure by narrowing down the amount of possible matching candidates and thereby increases the likelihood of more correctly matched correspondences. This in turn improves the optimization based on correspondences for localization of the camera.

More generally, another embodiment of such constrained image processing method, which computes filtered data from the image, which is constrained to the confident degrees of freedom with respect to the reference coordinate system, includes a matching process, such as matching a feature of the object in its reference coordinate system for which the constrain holds with one computed feature in the image resulting from the constrained image filter. The resulting improved matching can afterwards be used for localization of a moving camera taking the image(s) with respect to the reference coordinate system.

Similar to the filtering of gradients and edges with a certain orientation with respect to gravity, another embodiment of such a constrained image processing method could be to generate or filter in the image the horizontal gradients of planar or piecewise planar objects attached to a gravity aligned coordinate system, like the earth coordinate system. This output data can be generated, if additionally to the camera's orientation with respect to gravity its orientation with respect to the remaining degree of freedom of rotation, which as an example in an earth coordinate system corresponds to its heading to north and can be provided by a compass sensor, and additionally the normal of the planar or piecewise planar object with respect to the reference coordinate system is known. This constrained image processing output of horizontally aligned gradients can be used in further processing steps and applications similar to the filtering of gravity aligned gradients.

Another embodiment of a constrained image processing method is to generate filtered or processed image data of some property constrained to the confident degrees of freedom with respect to some reference coordinate system to allow any kind of matching between two frames, without the explicit knowledge about an object, such as a model of an object. To be more specific, if the reference coordinate system is the earth coordinate system and the confident degrees of freedom of the camera are its gravity orientation with respect to the earth coordinate system, image data can be derived with gravity aligned image processing in the different frames (i.e. images) of a moving camera. This resulting gravity aligned image data in the different frames can be used for matching correspondences between the frames. Later on these matches can be used for any approach dependent on frame-to-frame matches, such as but not limited to frame-to-frame tracking of a moving camera, image stitching or 3D reconstruction of the observed environment.

Yet another embodiment of an image processing method is to generate a distance transform image, which stores for each pixel in an image its closest distance to a pixel with the filtered property. For example, it could store for each pixel in an image its closest distance to a gravity aligned gradient. This distance transform image can later on be used, e.g., in a global registration algorithm, where different degrees of freedom are iteratively refined and the quality of the iteration is measured by a predefined cost-functions. The iterations of the global registration algorithms could be controlled by a particle filter approach as explained above.

Another embodiment of a constrained image processing method is sharpening an image by correcting motion blur effect or by smoothing the image according to some orientation defined with respect to gravity measurements or defined according to some camera motion measured with accelerometer or gyroscope data. Based on temporal information about the localization of the camera with respect to the reference coordinate system or provided directly by a sensor or system attached to the camera, a motion trajectory with respect to the reference coordinate system can be provided. Based on this movement vector the image processing method can be constrained to generate or filter data constrained to this motion trajectory, such as sharpening or smoothing or any other processing based on image filtering in relation to the trajectory motion. The results can be used as input to another image processing step, such as but not limited to detection of features in the sharpened image.

Another embodiment of a constrained image processing method is the adaption of the size of the kernel of an image filter dependent on the position of the camera with respect to the reference coordinate system. For instance, dependent on the distance of the camera to an object in the reference coordinate system the adaption of the size of the kernel of a gradient filter can improve the correct detection of edges in the image. The same holds for a smoothing or blur filter, which might be performed before another image processing method to e.g. reduce noise. The adaption of its kernel size can improve the later processing step, such as e.g. a gradient search.

Given a certain representation of the imaged object of interest, and given sensor data allowing having an approximate positioning of the camera with respect to the environment and particularly the object of interest, it is possible to estimate the distance between the object of interest and the camera. In the case of outdoor localization, the positioning data could be coming from a GPS system and the representation of the objects in the case of buildings could be coming from geographical data systems like commonly known OpenStreetMaps or Google Maps.

Given the estimated distance one could adapt the size of the kernel filter.

Localization of a moving capturing device, such as a camera, or a moving device equipped with a capturing device, such as a camera, with respect to objects in a coordinate system attached to the objects (defining a reference origin and a reference orientation) is an important task in the field of computer vision. Many different approaches have been proposed herein, which can be used in this field of application.

One big class includes vision-based localization, in which the data captured from one or multiple cameras, such as but not limited to visual light cameras, infrared cameras, time-of-flight cameras, depth camera systems, scanning systems or any other system providing some kind of image from the objects to be localized to, are analyzed and used for alignment with already known or during runtime learned representations of the objects. The proposed method in this application according to the various aspects of the invention, as set out herein, can be advantageously applied in this field and to any of the previously mentioned capturing devices.

While the invention has been described with reference to exemplary embodiments and applications scenarios, it will be understood by those skilled in the art that various changes may be made and equivalents may be substituted for elements thereof without departing from the scope of the claims Therefore, it is intended that the invention not be limited to the particular embodiments disclosed, but that the invention will include all embodiments falling within the scope of the appended claims and can be applied to various application in the industrial as well as commercial field.

What is claimed is:

1. An image processing method for vision-based localization of a device, comprising the steps of:
   obtaining an image depicting at least part of an object, and providing a coordinate system in relation to the image;
   providing at least one degree of freedom in the coordinate system or at least one sensor data in the coordinate system;
   computing image data of the image or at least part of the image constrained or aligned by the at least one degree of freedom or the at least one sensor data; and
   based on the image data, determining a position and orientation of a device with respect to an object in an augmented reality application or robotic system navigation application, the device associated with a capturing device for capturing the image.

2. The method according to claim 1, wherein the computed image data is a result of image processing including morphological image operations or image filtering.

3. The method according to claim 2, wherein the computing of image data is constrained or aligned according to degrees of freedom with a particular confidence degree or is constrained or aligned according to sensors providing data used in the image processing method in relation to the image or a device capturing the image.

4. The method according to claim 1, wherein computing the image data includes an image gradient computation which comprises filtering of gravity aligned gradients in the image.

5. The method according to claim 1, wherein computing the image data includes performing an image gradient computation which comprises image filtering with kernels, wherein the kernels are aligned with axes of the image or with a gravity vector.

6. The method according to claim 5, wherein in response to an image plane of the image being fronto-parallel to the gravity vector, a same gravity aligned kernel is applied to each pixel in the image.

7. The method according to claim 1, the method further including a process for matching at least one feature of the object in the image with at least one feature of a digital representation of the object.

8. The method according to claim 1, wherein the image data corresponds to a distance transform image.

9. The method according to claim 1, further including running a global registration algorithm, where different degrees of freedom are iteratively refined and a quality of each iteration is measured by a predefined cost-function.

10. The method according to claim 1, further comprising capturing the image with a capturing device and obtaining an estimation of intrinsic parameters of the capturing device.

11. The method according to claim 1, further comprising obtaining position and orientation data associated with a capturing device that captured the image, and determining the at least one degree of freedom in the coordinate system and associated confidence values based on the position and orientation data.

12. The method according to claim 1, further including the step of generating or filtering in the image vertical or horizontal gradients of planar or piecewise planar objects attached to a gravity aligned coordinate system.

13. The method according to claim 1, wherein the image data corresponds to a sharpened version of the image, the sharpened version sharpened in a direction of a movement of a capturing device associated with capturing the image.

14. The method according to claim 1, wherein computing the image data includes setting a size of a kernel of an image filter based on the position of a capturing device with respect to the coordinate system, the capturing device associated with capturing the image.

15. The method according to claim 1, further providing at least one sensor which provides information on one or multiple degrees of freedom, wherein the at least one sensor includes one or more of a GPS sensor, an inertial sensor, an accelerometer, a gyroscope, a magnetometer, an odometer, or a mechanical sensor, or one or more tracking systems.

16. The method according to claim 1, wherein the method includes at least one of image processing, filtering of information, and extraction of information.

17. The method according to claim 1, wherein the at least one degree of freedom is associated with a capturing device for capturing the image, the method further comprising obtaining a confidence degree associated with the at least one degree of freedom.

18. The method according to claim 17, wherein computing the image data comprises performing image filtering with a kernel, wherein the at least one degree of freedom corresponds to a gravity vector, and wherein the kernel is computed based on the gravity vector and the confidence degree.

19. The method according to claim 18, wherein the kernel comprises a Gaussian kernel for edge detection, the Gaussian kernel oriented with respect to the gravity vector, and associated with a standard deviation computed using the confidence degree.

20. A non-transitory computer readable medium comprising software code sections adapted to perform an image processing method for vision-based localization of a device, comprising the steps of:
   obtaining an image depicting at least part of an object, and providing a coordinate system in relation to the image;
   providing at least one degree of freedom in the coordinate system or at least one sensor data in the coordinate system;
   computing image data of the image or at least one part of the image constrained or aligned by the at least one degree of freedom or the at least one sensor data; and
   based on the image data, determining a position and orientation of a device with respect to an object in an augmented reality application or robotic system navigation application, the device associated with a capturing device for capturing the image.

* * * * *